United States Patent [19]

Franken

[11] Patent Number: 4,975,264
[45] Date of Patent: Dec. 4, 1990

[54] PROCESS FOR PURIFYING FLUE GASES CONTAINING SULFUR DIOXIDE

[75] Inventor: Wilhelm Franken, Bucheckernweg, Fed. Rep. of Germany

[73] Assignee: Gesthuysen & von Rohr, Huyssenallee, Fed. Rep. of Germany

[21] Appl. No.: 362,154

[22] Filed: Jun. 6, 1989

[30] Foreign Application Priority Data

Jun. 7, 1988 [DE] Fed. Rep. of Germany ....... 3819417

[51] Int. Cl.$^5$ .................. C01B 17/69; C01B 17/00
[52] U.S. Cl. .................................. 423/522; 423/242
[58] Field of Search .............. 423/522, 242 R, 242 A, 423/244 A, 244 R

[56] References Cited

U.S. PATENT DOCUMENTS

| | | | |
|---|---|---|---|
| 3,294,487 | 12/1966 | Pauling | 423/522 |
| 3,318,662 | 5/1967 | Pauling | 423/242 X |
| 3,950,493 | 4/1976 | Dorr et al. | 423/322 X |
| 4,842,835 | 6/1989 | Dorr et al. | 423/242 |

FOREIGN PATENT DOCUMENTS

3435931 4/1986 Fed. Rep. of Germany .

OTHER PUBLICATIONS

W/B Wasser, Luft Und Betrieb, 1/2/85, "Entschwefelung und Entstickung mit Liungstrom-Warmetauscher", pp. 48 and 50.
Staub, Reinhaltung der Luft, Band 47 (1987) Jul./Aug., p. IV.

Primary Examiner—Gregory A. Heller
Attorney, Agent, or Firm—Sixbey, Friedman, Leedom & Ferguson

[57] ABSTRACT

A process and system for purifying flue gases containing sulfur dioxide therein by scrubbing the flue gas with sulfuric acid and subsequently removing sulfur dioxide by moist activated carbon within a catalytic oxidation reactor. An improvement is achieved by the inclusion of a heat exchanger with tow flow paths; one connected to direct flow of clean gas saturated with water vapor from the catalytic oxidation reactor and the other flow path connected between the scrubber and the catalytic oxidation reactor permitting scrubbed flute gas to pass through. The scrubbed flue gas has a higher temperature than the clean gas, and the heat exchange results in the cooling of the scrubbed gas to the process temperature for the catalytic oxidation reaction and the warming of the clean gas above its dew point to facilitate rising of the clean gas in a chimney or like structure.

7 Claims, 1 Drawing Sheet

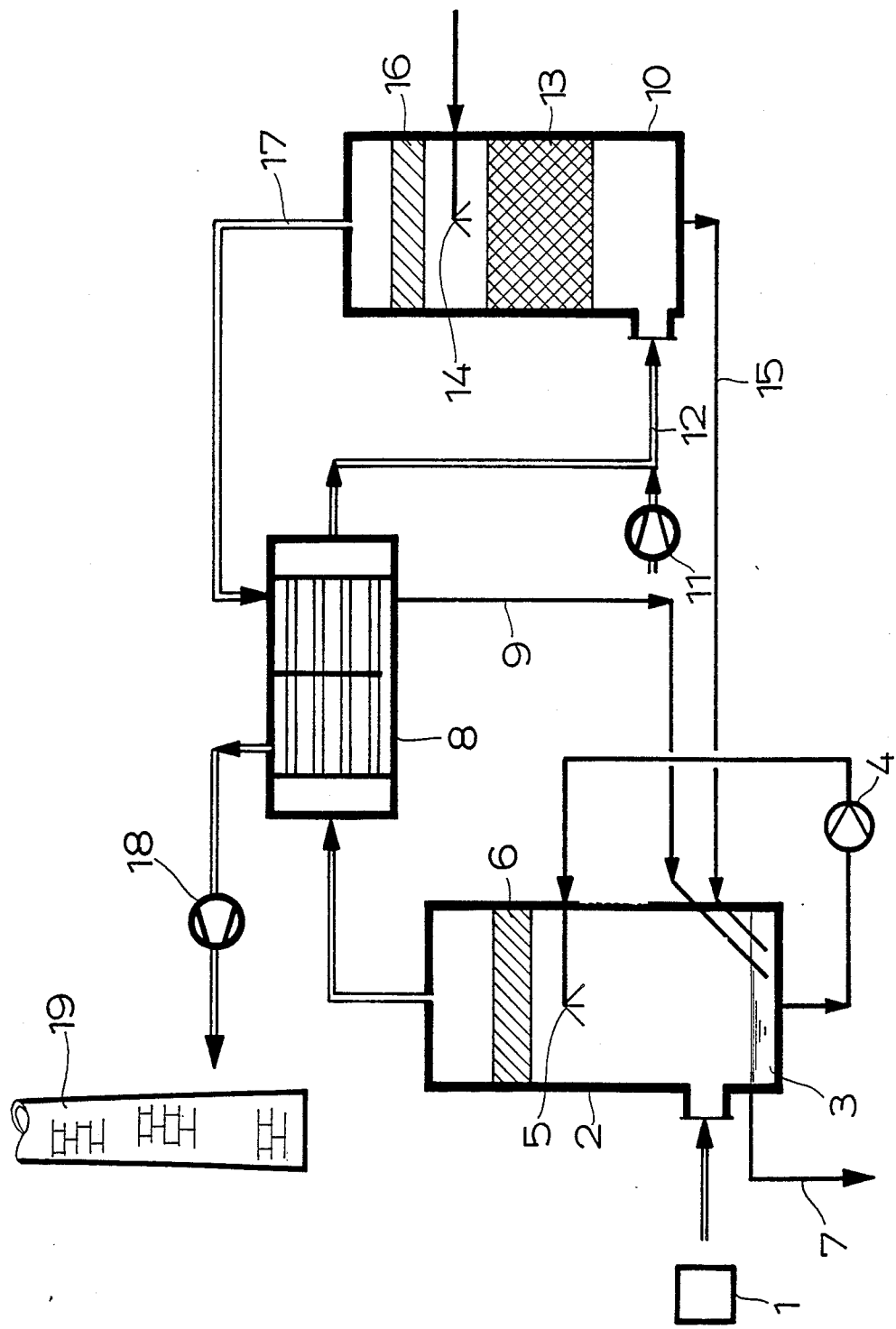

PROCESS FOR PURIFYING FLUE GASES CONTAINING SULFUR DIOXIDE

BACKGROUND OF THE INVENTION

1. Technical Field

The present invention is related to the improved purification of flue gases containing sulfur dioxide by catalytic oxidation on moist activated carbon including a process of purification as well as a system for performing such a process.

2. Description of the Prior Art

Many processes are known to reduce the sulfur dioxide in exhaust gases or flue gases. Probably the most significant process to purify flue gases containing sulfur dioxide is by catalytic oxidation on moist activated carbon. One such process is disclosed in German Offenlegungsschrift No. 34 35 931. In this process, the flue gas laden with sulfur dioxide is first scrubbed in two steps with sulfuric acid which, on the one hand, saturates the flue gas with water vapor, and on the other hand cools the flue gas to the process temperature of the catalytic oxidation. The flue gas then passes over an activated carbon filter that is either continuously or intermittently sprayed with a sufficient amount of water so that a 3 to 20% sulfuric acid runoff is maintained. While the flue gas is passing through the activated carbon filter, the flue gas again becomes saturated with water vapor. Thereafter, clean gas exits the activated carbon filter and is sent into the atmosphere either directly or after a heating step.

Since this clean gas leaving the activated carbon filter is saturated with water vapor, a sufficient ascending force of the clean gas to rise through a guiding conduit, for example in a chimney, is not always guaranteed. To improve this ascending force, in another known process, the clean gas is either heated in an auxiliary device by hot flue gases (see, e.g., the magazine "STAUB" [Dust], Volume 47 (1987), page IV, figure ST 3769) or is indirectly warmed in one or more heat exchangers supplied with a separate energy source. Thus, the heated or warmed clean gas will rise better so as to reach the atmosphere, by way of a chimney, for example. However, use of the heat exchanger operating with a separate energy source is disadvantageous in that the use is accompanied by a considerable energy cost.

SUMMARY OF THE INVENTION

It is a primary object of the present invention to provide a process for purifying flue gases containing sulfur dioxide that overcomes the deficiencies and disadvantages associated with the prior art.

It is also an object of the present invention to provide a process for purifying flue gases containing sulfur dioxide by catalytic oxidation on moist activated carbon, wherein the clean gas is guaranteed to have a sufficient ascending force, without the need for an additional energy supply and with a limited equipment arrangement.

The process and system according to the present invention wherein the above-noted objects as well as others are achieved, is outlined as follows. The sulfur dioxide laden flue gas is initially scrubbed with sulfuric acid, and then the flue gas is passed over moist activated carbon, which is the catalytic oxidation step of the process. The result is that the sulfur dioxide reacts in the oxidation process step with oxygen and with water vapor. However, before the flue gas passes through the catalytic oxidation step over the moist activated carbon and after the scrubbing of the flue gas with sulfuric acid, the flue gas is conducted into a heat exchanger which is secondarily connected after the catalytic oxidation step to the clean gas side, so that the scrubbed flue gas is cooled to nearly, if not exactly, the process temperature of the catalytic oxidation and the clean gas is warmed to a temperature above its dew point to ensure rising of the clean gas.

In this case, it is essential that the scrubbed flue gas and the desulfurized clean flue gas pass through a heat exchanger defining flow paths that are separated from one another and are in a heat exchange relationship to one another. Consequently, the heat exchanger fulfills two functions, namely the cooling of the flue gas that has first been scrubbed but advantageously still has a high temperature, corresponding to about the process temperature of the catalytic oxidation, and the warming of the desulfurized clean flue gas, preferably to a temperature above the dew point of the clean gas. Thus, the energy that must be released from the flue gas before the catalytic oxidation process is advantageously completely transferred to the clean gas to be exhausted into the atmosphere. By this measure, no separate energy source is required either for cooling the flue gas before the catalytic oxidation process step or for warming the clean gas to be exhausted into the atmosphere. Moreover, the process and system according to the present invention optimally exploits the energy inherent in the process and thus reduces the operating costs of a unit using this process. Since no other additional equipment is required in addition to the heat exchanger, the equipment expense is low. The process thus is particularly suitable for small furnaces.

Although there are many different possible configurations and further developments that can be advantageously made in accordance with the teachings of this invention, one preferred embodiment of the invention is specifically set forth below in association with the accompanying figure.

BRIEF DESCRIPTION OF THE DRAWINGS

The sole FIGURE is a schematic view of a system for purifying flue gases in accordance with the present invention and illustrates the process as well.

DETAILED DESCRIPTION OF A PREFERRED EMBODIMENT

With reference to the diagram of the sole FIGURE, the structure and course of one embodiment of the invention is described below by way of an example for purifying flue gases containing sulfur dioxide from a small steam generating unit (up to about 5 MW) that is operated with heavy fuel oil. The process and system according to the invention can of course be used not only for desulfurization of flue gases from the heavy oil furnace but generally for desulfurizing any flue gases.

In the FIGURE, a combustion unit 1 is shown wherein moist flue gas containing sulfur dioxide develops during the combustion of heavy fuel oil in a small steam generating unit. Combustion unit 1 delivers about 1,000 Nm$^3$ per hour of moist flue gas (Nm$^3$ means a "normalized" cubic meter, i.e., a cubic meter under "normalized" conditions of a temperature of 0° C. and a pressure of 1.0 bar). The flue gas to be purified contains per Nm$^3$, 1,600 mg of SO$_2$, 2 to 3% by volume of O$_2$ and 13% by volume of H$_2$O. The flue gas flows out of combustion unit 1 at a temperature of about 210° C. into a scrubber 2.

The flue gas is scrubbed with sulfuric acid in scrubber 2. This is performed here preferably by countercurrent spraying, which means that the sulfuric acid is sprayed opposite to the flow direction of the flue gas. However, the scrubber could also operate concurrent, or yet another kind of scrubber, e.g., a known bubble tank, could also be used. The concentration and temperature of the sulfuric acid to be used is determined, on one hand, according to the water content of the flue gas, and on the other hand, according to the amount of dilute sulfuric acid that is developed in the catalytic oxidation process step, which will be discussed in more detail later. For the entire purification process it is especially advantageous if the flue gas is scrubbed with a 60 to 80% sulfuric acid. In the preferred embodiment, an approximately 73% sulfuric acid concentration with a temperature of about 130° C. is used. The sulfuric acid required for scrubbing the flue gas is supplied from a collecting tank 3 made in the bottom area of scrubber 2 by way of a pump 4 to a nozzle 5 provided at approximately the middle of scrubber 2. By spraying the rising flue gas in scrubber 2, fine dust particles are removed from the flue gas, and the flue gas becomes saturated with water vapor.

Before leaving scrubber 2, the scrubbed flue gas passes through a separator 6 comprising a spray separator. Separator 6 prevents sulfuric acid from being entrained with the flue gas and thus exiting scrubber 2. The sulfuric acid trapped in separator 6 also eventually accumulates into collecting tank 3. During the scrubbing of the flue gas, about 3 kg of 73% sulfuric acid per hour is developed in connection with an oxidation process step, explained later. The sulfuric acid no longer needed for scrubbing is then discharged by an overflow or drain pipe 7, wherein the discharged sulfuric acid can be stored or concentrated in a separate process.

After scrubbing, the flue gas partially saturated with water vapor flows into a heat exchanger 8. On entering heat exchanger 8, the flue gas exhibits a temperature of about 130° C. In the heat exchanger 8, the flue gas is cooled indirectly to about 90° C. Any condensate that may develop in the heat exchanger 8 is fed by a pipe 9 to the collecting tank 3 of scrubber 2. The cooling medium used in the heat exchanger 8 will be described below.

From the heat exchanger 8, the flue gas is directed to an activated carbon reactor 10. To promote the catalytic oxidation process that takes place in the activated carbon reactor 10, it is especially advantageous to have air fed to the flue gas before entry into activated carbon reactor 10. This air not only cools the flue gas, but also enriches it with oxygen. In the preferred embodiment, about 200 $Nm^3$ of air with a temperature of about 20° C. is fed per hour by a blower 11 to the flue gas. Thus, about 1,200 $Nm^3$ per hour of flue gas and air with a temperature of about 79° C. (the process temperature of the activated carbon reactor 10) reaches activated carbon reactor 10 by way of pipe 12. The gas flowing into the activated carbon reactor 10, including a mixture of flue gas and air, exhibits a sulfur dioxide content of about 1,300 mg/$Nm^3$. Further, the gas contains 5 to 6% of oxygen by volume and about 14.7% by volume of water.

To perform the catalytic oxidation, the activated carbon reactor 10 is provided with several layers of activated carbon 13 with varying degrees of granularity. The gas flows thus through the activated carbon reactor 10, thereby passing through the activated carbon 13 from the bottom to the top of the reactor 10, as seen in FIG. 1. Here the sulfur dioxide of the flue gas is deposited on the activated carbon 13 which is intermittently scrubbed or driven out of the activated carbon 13 with water. About 60 kg of water per hour is sprayed onto the activated carbon 13 by a nozzle 14 located just above the activated carbon 13. Thus, an approximately 5% sulfuric acid is developed that collects in the bottom area of the activated carbon reactor 10 and is fed from there by a pipe 15 to the collecting tank 3 of scrubber 2. After the flue gas, which is mostly free of sulfur dioxide, leaves the activated carbon 13 and before it leaves the reactor 10 as clean gas, the flue gas flows through a spray separator 16 to trap entrained sulfuric acid. The sulfuric acid trapped by spray separator 16 also accumulates into the bottom area of the activated carbon reactor 10 and from there is fed to collecting tank 3 of scrubber 2.

As described above, the concentration and the temperature of sulfuric acid in scrubber 2, among other things, is determined according to the amount of sulfuric acid being discharged from the activated carbon reactor 10. With the above-mentioned gas composition, pipe 15 feeds about 44 kg of 5% sulfuric acid per hour at about 50° C. to scrubber 2. This acid is preferably concentrated in collecting tank 3 to about 73% by water evaporation.

The clean gas that exits the activated carbon reactor 10 is saturated with water vapor and exhibits a temperature of about 56° C. Next and essential to the invention, the clean gas saturated with water vapor, after exiting the activated carbon reactor 10, is directed to the heat exchanger 8 by pipe 17. In the heat exchanger 8, the cleaned gas, acting as the cooling or heat absorption medium, enters a heat exchanging relationship with the hotter flue gas conducted from scrubber 2 into the heat exchanger 8. Here the flue gas and the clean gas flow in heat exchange flow paths separated from one another.

According to the invention, heat exchanger 8 exhibits two different functions. On the one hand, it utilizes the clean gas to cool the flue gas flowing out of scrubber 2 to about 90° C., and on the other hand, it causes the clean gas flowing out of activated carbon reactor 10 to be warmed the flue gas to a temperature above the dew point of the clean gas, preferably to a temperature of about 85° C. The energy necessarily discharged during the cooling of the flue gas is thus used to warm the clean gas. Thereby, there is no need for the provision of any external energy either for cooling of the flue gas or for the warming of the clean gas. In addition, there is another advantage in that the cooling of the flue gas and the warming of the clean gas can be performed in one and the same device, a single heat exchanger 8. There is no need for additional auxiliary equipment.

After flowing through heat exchanger 8, the clean gas can be fed to a chimney 19, out of which the clean gas will rise. Optionally, a blower 18 can be included before the chimney 19 to further facilitate gas flow. From there the clean gas, which is substantially freed of sulfur dioxide, reaches the atmosphere.

In the preferred embodiment that is representative of the process and system according to the invention, about 1,270 $Nm^3$ per hour of clean gas saturated with water vapor is exhausted into the atmosphere. Here the clean gas contains about 130 mg/$Nm^3$ of sulfur dioxide, 5 to 6% by volume of oxygen and about 16% by volume of water. The separation degree of sulfur dioxide of the process is over 90%.

It is understood that many embodiments of heat exchangers, activated carbon reactors, scrubbers, pumps, and other equipment could be used in place of those described. Thus, the present invention is not intended to be limited by the preferred embodiment, but only by the following claims.

What is claimed is:

1. A process for purifying flue gases containing sulfur dioxide including the steps of scrubbing the flue gases with sulfuric acid and thereafter passing the scrubbed flue gases through a catalytic oxidation means comprising moist activated carbon for reacting said sulfur dioxide with oxygen and water and producing dilute sulfuric acid and clean gas saturated with water, wherein heat is transferred between the flue gases and the clean gas saturated with water, by a heat exchanger, after the flue gases have been scrubbed with sulfuric acid but before they pass through said catalytic oxidation means, thereby indirectly cooling the scrubbed flue gases to near the process temperature of the catalytic oxidation means and, simultaneously, warming the clean gas saturated with water prior to passing it into the atmosphere.

2. The process according to claim 1, wherein the clean gas saturated with water is warmed by the scrubbed flue gases in said heat exchanger means to a temperature above its dew point.

3. Process according to claim 1, wherein the flue gases scrubbed with sulfuric acid flow through a separator to trap entrained sulfuric acid.

4. Process according to claim 1, wherein the flue gases scrubbed with sulfuric acid, before entry into the heat exchanger means, exhibit a temperature between 100° C. and 150° C.

5. The process according to claim 4, wherein the flue gases scrubbed with sulfuric acid, before entry into the heat exchanger, exhibit a temperature between 110° C. and 130° C.

6. Process according to claim 1, wherein air is supplied to the flue gases flowing out of the heat exchanger means before the catalytic oxidation means, and so as to cool said flue gases flowing out of said heat exchanger means by the air supplied, to the process temperature of the catalytic oxidation means, and to enrich said flue cases with oxygen.

7. Process according to claim 1, wherein the clean gas coming out of the catalytic oxidation means flows through a separator to trap entrained sulfuric acid.

* * * * *